United States Patent
Tran et al.

(10) Patent No.: US 11,529,776 B2
(45) Date of Patent: Dec. 20, 2022

(54) AIRCRAFT COMPRISING COMPOSITE STRUCTURAL COMPONENT, AND METHOD FOR FORMING COMPOSITE STRUCTURAL COMPONENT

(71) Applicant: The Boeing Company, Chicago, IL (US)

(72) Inventors: Davis Tran, Seattle, WA (US); Richard Jameson Langabeer, Jr., Everett, WA (US); Weidong Song, Woodinville, WA (US)

(73) Assignee: THE BOEING COMPANY, Chicago, IL (US)

( * ) Notice: Subject to any disclaimer, the term of this patent is extended or adjusted under 35 U.S.C. 154(b) by 542 days.

(21) Appl. No.: 16/529,464

(22) Filed: Aug. 1, 2019

(65) Prior Publication Data
US 2021/0031466 A1 Feb. 4, 2021

(51) Int. Cl.
| | |
|---|---|
| B29C 70/50 | (2006.01) |
| B64F 5/10 | (2017.01) |
| B64C 3/18 | (2006.01) |
| B29K 63/00 | (2006.01) |
| B29K 307/04 | (2006.01) |
| B29L 31/30 | (2006.01) |

(52) U.S. Cl.
CPC .............. B29C 70/50 (2013.01); B64C 3/182 (2013.01); B64F 5/10 (2017.01); *B29K 2063/00* (2013.01); *B29K 2307/04* (2013.01); *B29L 2031/3085* (2013.01)

(58) Field of Classification Search
CPC ......... B29C 70/50; B29C 70/526; B64C 3/18; B64C 3/182; B29D 99/0005
See application file for complete search history.

(56) References Cited

U.S. PATENT DOCUMENTS

| | | |
|---|---|---|
| 2010/0140834 A1 | 6/2010 | Sherwood et al. |
| 2014/0069586 A1 | 3/2014 | Anderson et al. |
| 2015/0099096 A1* | 4/2015 | Forston ................... B32B 27/08 156/244.11 |
| 2015/0360396 A1* | 12/2015 | Thomas ................ B29C 39/028 428/221 |
| 2017/0029577 A1* | 2/2017 | Glynn .................... B29C 70/081 |
| 2017/0197346 A1* | 7/2017 | Song ........................ B29C 48/92 |

(Continued)

OTHER PUBLICATIONS

European Patent Office, Extended European Search Report Issued in Application No. 20171992.9, dated Oct. 28, 2020, Germany, 8 pages.

*Primary Examiner* — Michael H Wang
(74) *Attorney, Agent, or Firm* — Alleman Hall Creasman & Tuttle LLP (57) ABSTRACT

A method for fabricating a composite wing structural component for an aircraft is described. The method comprises extruding a filler material into each mold channel of a plurality of mold channels of a die to form a plurality of filler segments, removing the plurality of filler segments from the plurality of mold channels of the die, and arranging the plurality of filler segments in a space in the composite structural component, the space being defined by a radius of the composite structural component, such that the filler segments are in end-to-end contact. The method further comprises curing the plurality of filler segments in the space to fuse the plurality of filler segments.

14 Claims, 11 Drawing Sheets

(56) References Cited

U.S. PATENT DOCUMENTS

2017/0253346 A1* 9/2017 Schaaf ...................... B64C 1/00
2019/0009477 A1* 1/2019 Gordon .............. B29D 99/0005
2020/0269529 A1* 8/2020 De Kock .............. B29C 70/525

* cited by examiner

AIRCRAFT COMPRISING COMPOSITE STRUCTURAL COMPONENT, AND METHOD FOR FORMING COMPOSITE STRUCTURAL COMPONENT

FIELD

The invention relates to aircraft, and more particularly to composite structural aircraft components comprising spaces with fillers.

BACKGROUND

A typical aircraft includes a mechanical structure formed of skin panels attached to an underlying airframe. The skin panels form a surface that is acted upon by aerodynamic forces during flight. As the skin panels may be made relatively light and thin to reduce the overall weight of the aircraft and increase its potential payload and range, the airframe includes structures configured to reinforce the skin panels, and also to impart aerodynamic forces acting upon the skin panels to load-bearing support structures. The airframe thus prevents undesired flexure, vibration, and other types of skin panel motion while distributing forces to locations configured to bear loads.

In some aircraft, structures referred to as "stringers" are used to stiffen skin panels and transmit aerodynamic forces acting upon the skin panels to load-bearing structures, such as spars and/or ribs. Stringers may assume various forms and material composition. In some examples, stringers are formed from a composite material (e.g. a carbon fiber-epoxy composite). Depending upon the cross-sectional shape of such a stringer, the stringer may be formed from two or more different parts that are fused or otherwise joined together. One example of such a composite stringer has a blade-shaped cross section with a flange and a web and is formed by fusing together two curved stringer portions, each comprising a web portion, a flange portion, and a radius between the web portion and the flange portion. Due to the radii, a space is formed in the flange portion of the stringer where the two stringer portions meet. This space may be filled with a filler material, referred to herein as a filler or radius filler, to further strengthen the composite stringer.

As stringers may be arranged longitudinally along portions of an aircraft body, such as along a wing, the length of the stringer, and thus the length of the filler added to the space, may be relatively long. For example, when positioned in the wing of a commercial aircraft, the length of a composite wing stringer may be in a range of eighty to one hundred feet. Fabricating a filler with a length in this range poses various challenges. For example, where the filler piece is formed by extruding the filler material into a mold formed in a die, a die of the necessary length will occupy significant valuable factory space. Further, as the length of filler piece increases, the number of people needed to handle the filler piece (e.g. to remove it from the die and transfer it to the stringer space) also increases. While an assisted lift may be used to extract fabricated filler pieces, such tools may impose production flow issues, and consume valuable space in clean room storage and also on a manufacturing floor. Thus, in view of the above, a challenge exists to fabricate filler segments for composite stringers and potentially other composite structural components.

SUMMARY

To address the above issues, according to one aspect of the present disclosure, a method of fabricating a composite structural component for an aircraft is provided. In this aspect, the method includes extruding a filler material into each mold channel of a plurality of mold channels of a die to form a plurality of filler segments and removing the plurality of filler segments from the plurality of mold channels of the die. The method further includes arranging the plurality of filler segments in a space in the composite structural component, the space being defined by a radius of the composite structural component, such that the filler segments are in end-to-end contact. The method further includes curing the plurality of filler segments in the space to fuse the plurality of filler segments.

Another aspect of the present disclosure relates to an aircraft comprising a fuselage and a wing extending from the fuselage. In this aspect, the wing comprises a composite wing stringer including a flange, a web, and a radius where the flange and web meet, the radius defining a space. The composite wing stringer further comprises a radius filler located within the space, the radius filler comprising a plurality of filler segments each fused with one or more adjacent filler segments in an end-to-end arrangement.

Yet another aspect of the present disclosure relates to a composite wing stringer for an aircraft, the composite wing stringer comprising a flange, a web extending from the flange, and a radius where the flange and web meet, the radius defining a space. The composite wing stringer further comprises a radius filler located within the space, the radius filler comprising a plurality of filler segments each fused with one or more adjacent filler segments in an end-to-end manner.

Yet another aspect of the present disclosure relates to a die for forming a radius filler for a composite aircraft wing stringer. The die comprises a plurality of mold channels arranged across a surface of the die; each mold channel shaped to form a radius filler segment for a radius filler.

The features, functions, and advantages that have been discussed can be achieved independently in various embodiments or may be combined in yet other embodiments, further details of which can be seen with reference to the following description and drawings.

DETAILED DESCRIPTION

In view of the considerations discussed above, methods and apparatuses are provided that relate to fabrication of a radius filler in segments that are fused after being installed. Briefly, a filler material is extruded into multiple mold channels of a die to thereby form multiple filler segments. The filler segments are removed from the die and arranged in end-to-end contact in a space where the web and flange of a composite wing stringer meet, or in a space of another structural component. The filler segments are then cured to fuse the segments, which thereby form a unitary filler structure. The fabrication of a radius filler from multiple filler segments enables the use of a compact die and thus savings in space occupied by the die and other fabrication tools, a reduction in labor, and a reduction in the complexity of the filler fabrication process.

Figure 1:
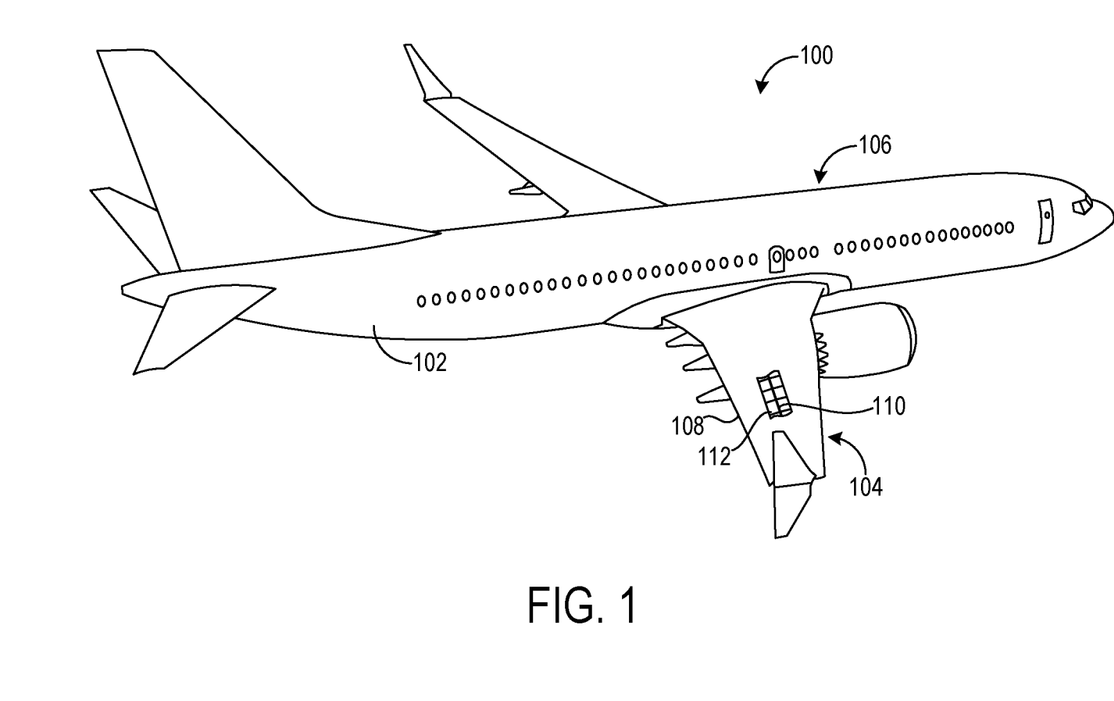
FIG. 1 shows an illustration depicting an aircraft according to an example embodiment of the present disclosure.

FIG. 1 illustrates an example aircraft 100 having a mechanical structure formed in part by a skin 102 attached to an underlying airframe 104. Among other components, airframe 104 includes a fuselage 106 and a wing 108 extending from the fuselage 106. FIG. 1 shows a portion of skin 102 removed from wing 108, revealing various structural components of the wing 108, including a wing stringer 110 extending from wing root to wing tip. Wing stringer 110 is attached to a plurality of ribs (e.g. rib 112), and to the skin 102 of wing 108. Accordingly, wing stringer 110 reinforces and stiffens the skin 102 of wing 108 as well as transferring aerodynamic forces acting on the wing skin to the plurality of ribs and to other load-bearing components of airframe 104.

Wing stringer 110 may be formed from a composite material (e.g. a carbon fiber-epoxy composite). Composite structural component, as used herein, refers to a structural component that is made of composite portions and combined to make a structural component, such as, for example a beam, spar, stringer, or any similar load bearing support structure. In such examples, wing stringer 110 is a composite structural component referred to as a "composite wing stringer". Composite wing stringer 110 may be fabricated by joining together a plurality of parts. As described above, some wing stringer parts comprise a radius that forms a space unoccupied by stringer material when joined together. This space thus may be filled with segments of a radius filler material fabricated, positioned in the wing stringer, and fused as described herein.

Figure 2A:
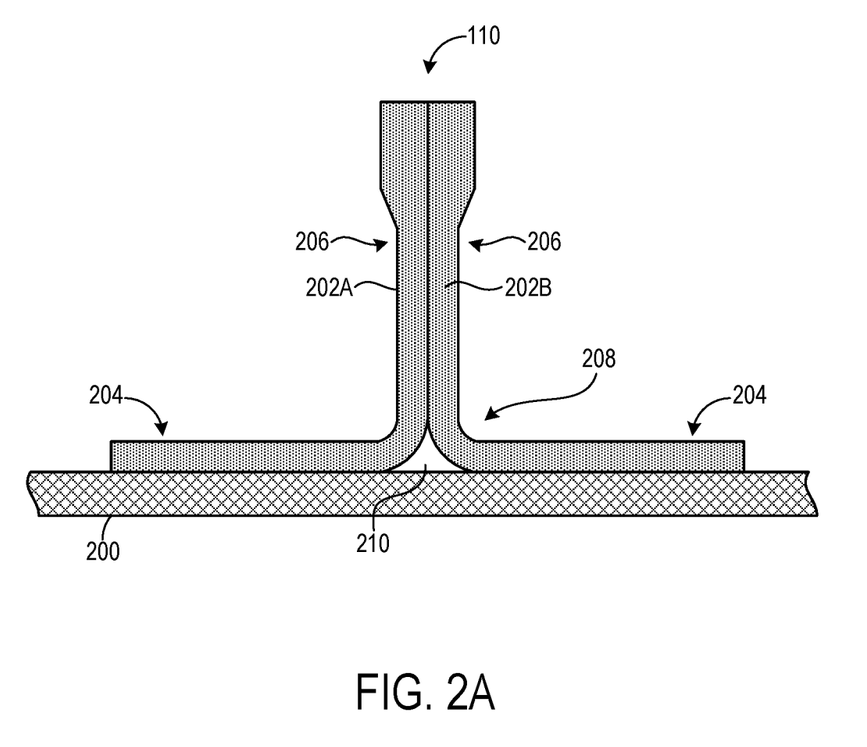
FIGS. 2A and 2B show an illustration depicting a cross-section of a composite wing stringer according to an example embodiment of the present disclosure.
Figure 2B:
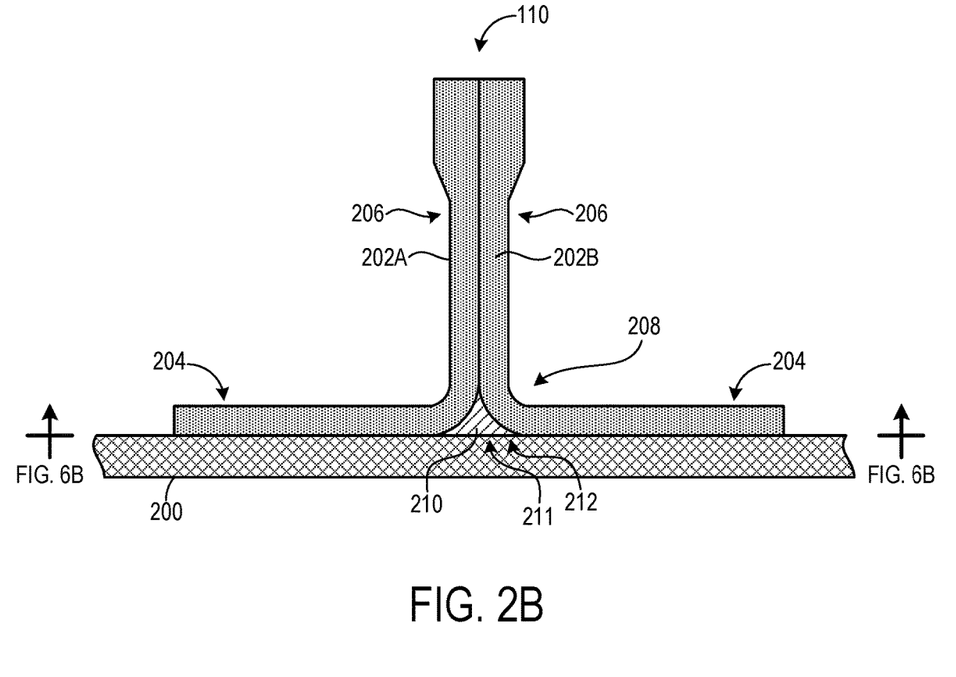

FIGS. 2A-2B show a cross-sectional view of wing stringer 110 attached to a skin panel 200 that forms a portion of skin 102 (FIG. 1). In the depicted example, wing stringer 110 comprises a composite blade stringer formed by a first stringer portion 202A joined with a second stringer portion 202B. Composite wing stringer 110 includes a flange 204 and a web 206 formed by joining first stringer portion 202A and second stringer portion 202B. As shown in FIG. 2A, both stringer portions 202 include a radius (shown at 208 for second stringer portion 202B) where the flange and web meet, which together define a space 210. The space 210 may run along a length of the stringer 110. As described in further detail below, after joining stringer portions 202A and 202B, space 210, as it extends along the length of the stringer, is filled with a plurality of radius filler segments 211 forming a unitary radius filler 212, as shown in FIG. 2B. The stringer assembly is then cured to fuse the various components to form stringer 110. Curing the assembly fuses the radius filler segments to form a radius filler in space 210, as indicated by the cross-hatching in space 210. In this process, the radius filler segments also fuse to the stringer portions 202A and 202B. The radius filler may thereby increase the structural integrity of composite wing stringer 110, and its ability to stiffen skin panel 200 and transmit forces acting upon the skin panel to load-bearing structures in airframe 104. The approaches described herein for forming a radius filler for a wing stringer also may be applicable to other types of stringers, to non-stringer structural components (e.g. longerons), and to wing stringer geometries other than that depicted in FIGS. 2A-2B.

Figure 3:
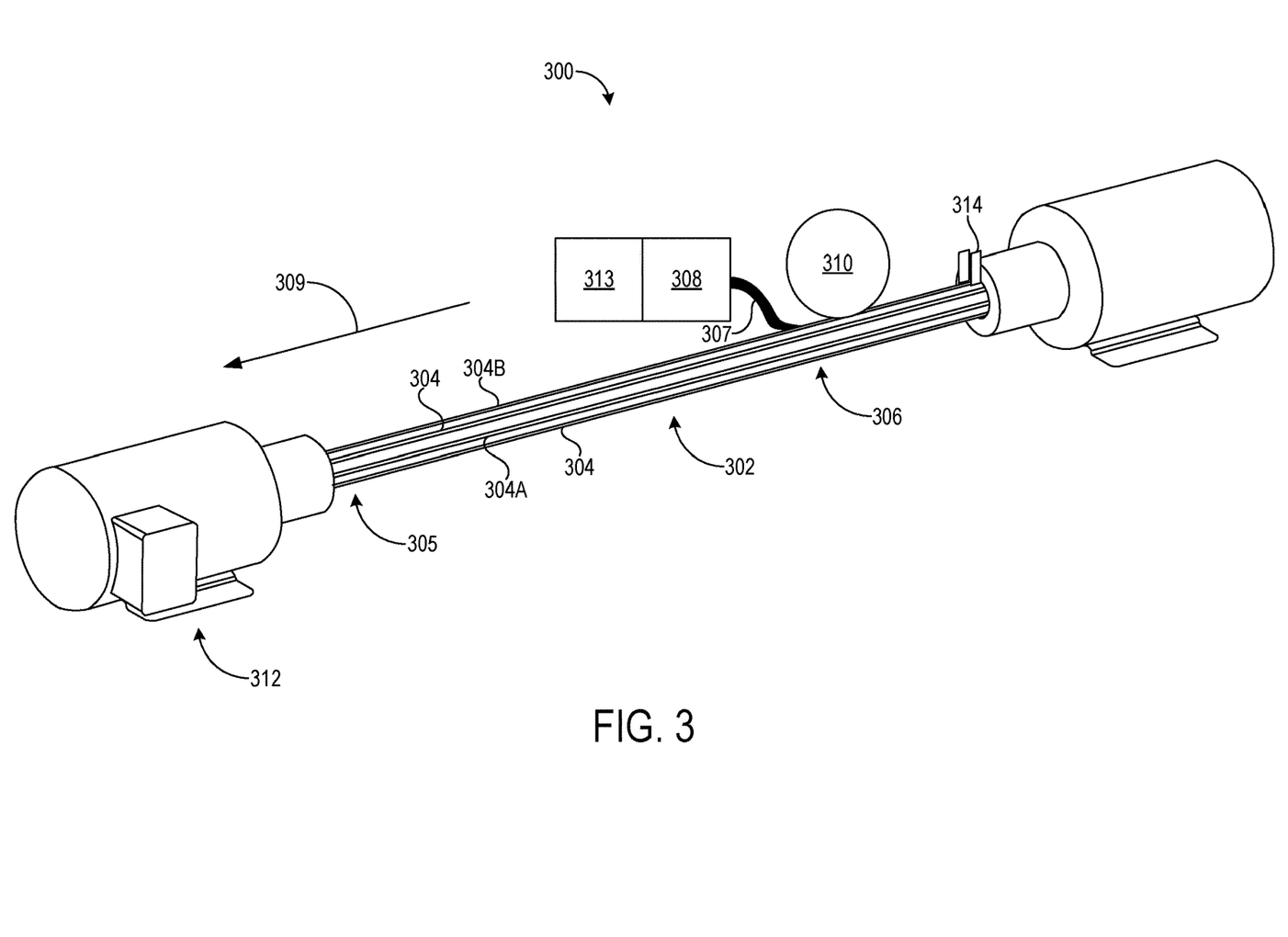
FIG. 3 shows an illustration depicting an apparatus including a rotary die for fabricating radius filler segments for the example composite wing stringer of FIGS. 2A-2B.

FIG. 3 depicts an apparatus 300 including a rotary die 302 for fabricating radius filler segments for composite wing stringer 110 (FIG. 1). Rotary die 302 includes a plurality of mold channels 304 including mold channel 304A arranged around a circumference 305 (best shown in FIG. 4A) of a surface 306 (best shown in FIG. 4A) of the rotary die. Each mold channel is shaped to form a radius filler segment that may be arranged with other radius filler segments in an end-to-end manner and then fused to form a radius filler for composite wing stringer 110. As such, each mold channel has a cross-sectional shape that matches the geometry of space 210 (FIGS. 2A-2B), such that a radius filler segment 211 formed in a mold channel 304 fills the space 210 when inserted therein.

An example radius filler segment fabrication process includes extruding a filler material 307 from an extrusion orifice 308 into a mold channel 304B. For example, by moving one or both of rotary die 302 and the orifice 308, as indicated by arrow 309, the filler material 307 is deposited into a length of the mold channel 304B. Optionally, a compactor such as compaction wheel 310 applies pressure to the filler material 307 to cause the filler material 307 to take a shape of the mold channel. Compaction wheel 310 is shown schematically in FIG. 3, however, any other suitable structure may be used to apply pressure to filler material 307 to press the extruded filler material 307 firmly into the mold channel. When extruded into a mold channel 304, the filler material 307 forms a radius filler segment 211 configured to fill space 210 of composite wing stringer 110 (FIGS. 2A-2B) and thereby reinforce the composite wing stringer 110. The filler material 307 may comprise any suitable material(s), including but not limited to a discontinuous carbon (e.g. graphite) fiber material comprising fiber segments and an epoxy (e.g. thermoset) matrix that can be fused to other stringer components in a curing process.

Figure 4A:
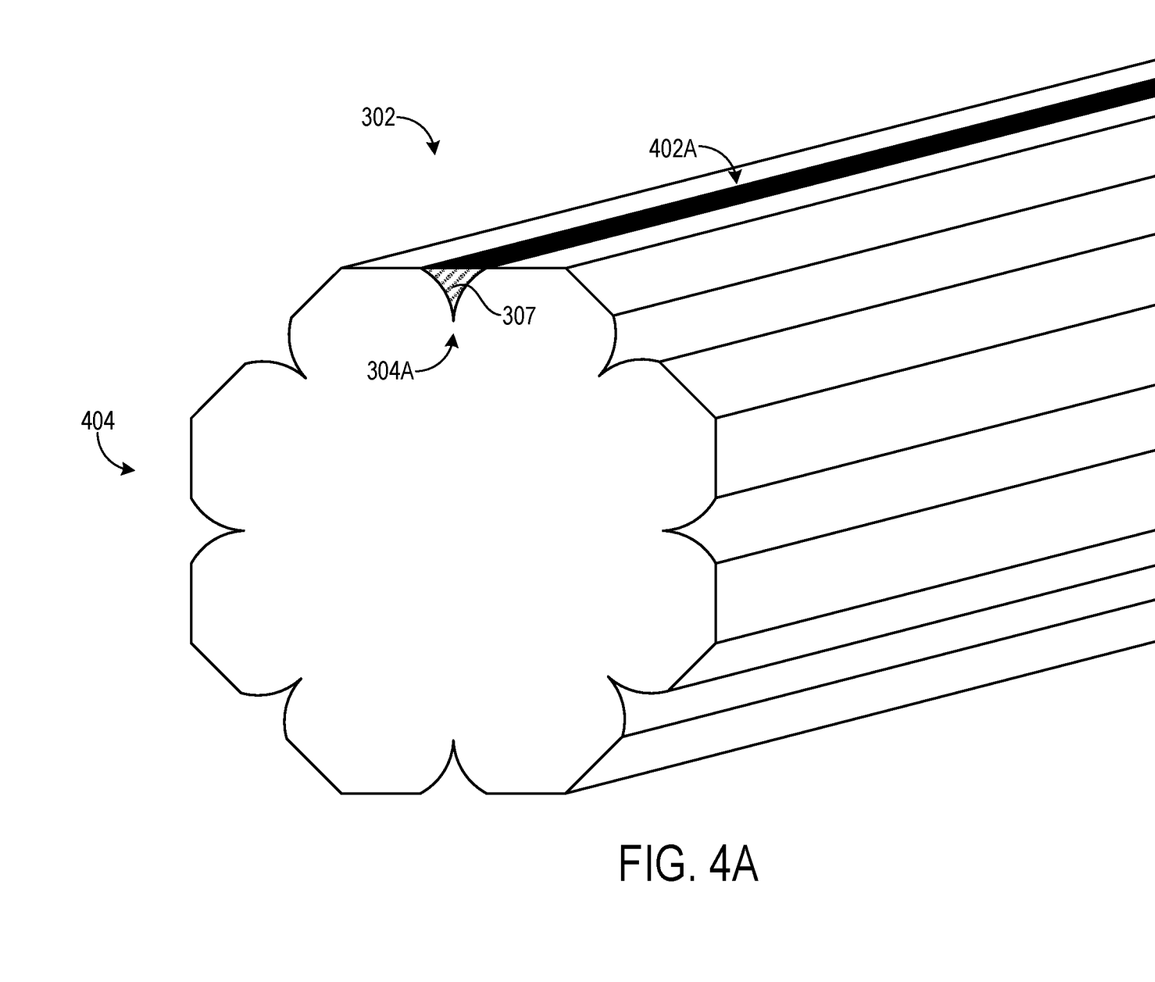
FIGS. 4A-4C show illustrations of the rotary die of FIG. 3 in respective states of fabricating example radius filler segments.
Figure 4B:
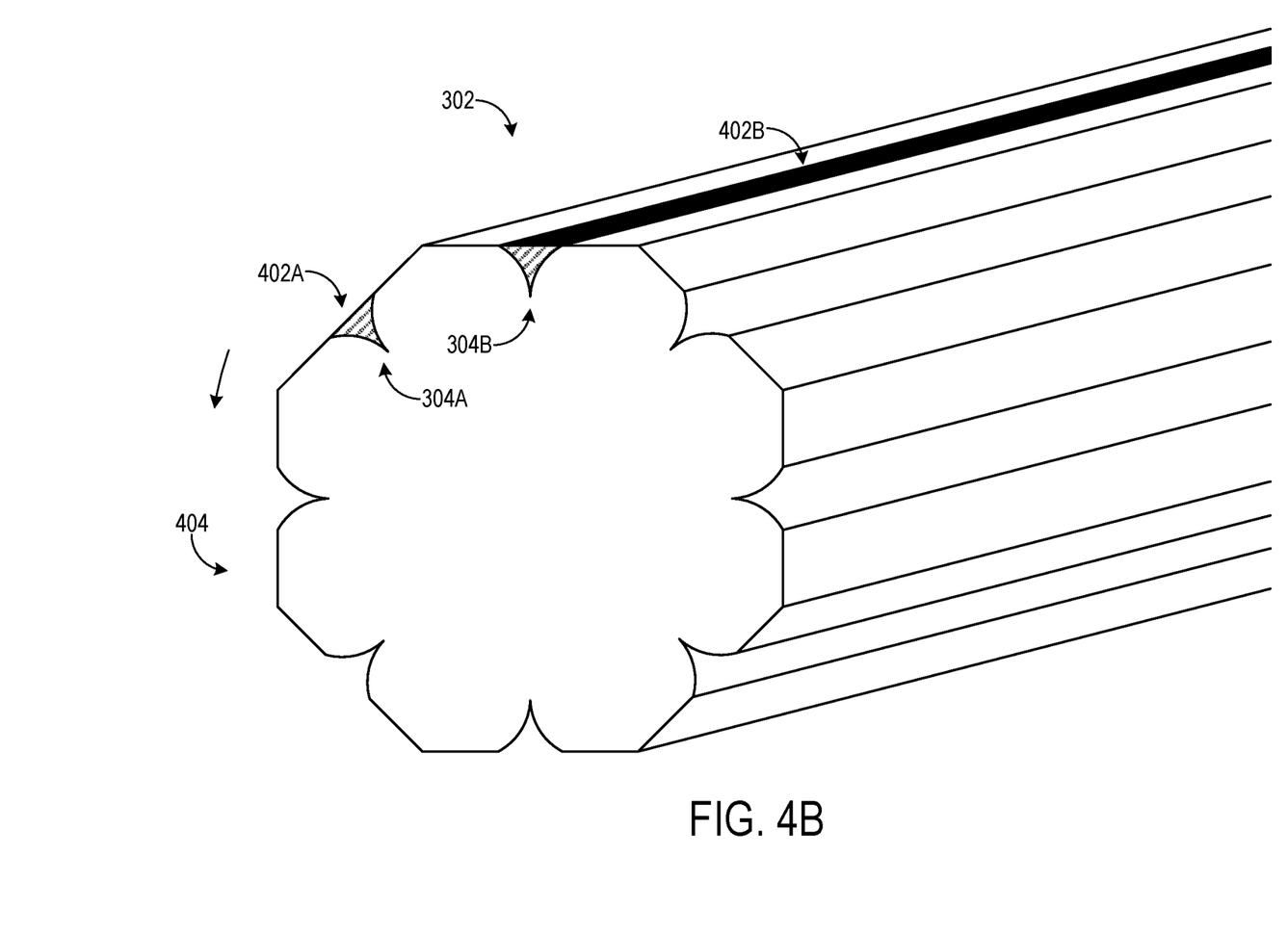
Figure 4C:
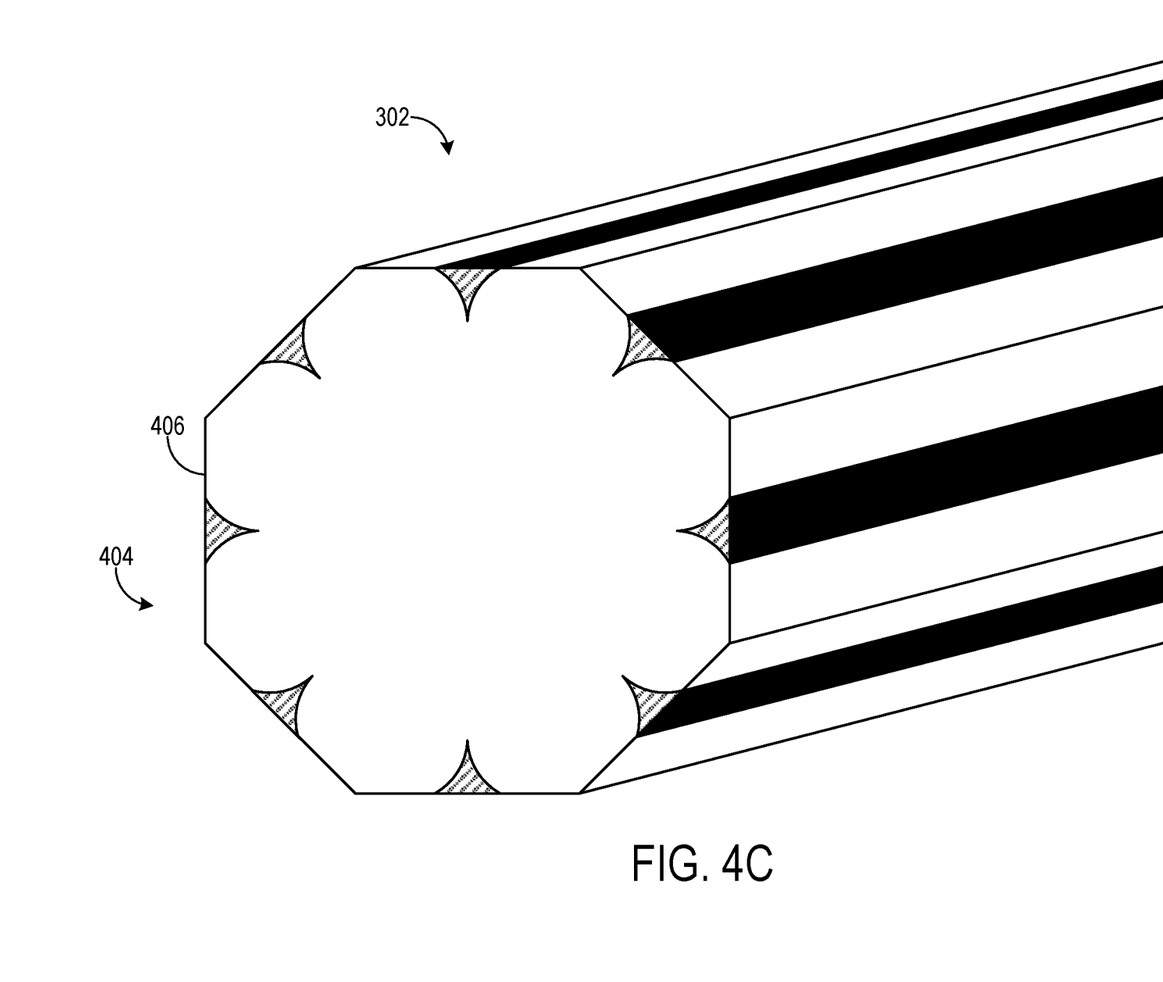

As each mold channel 304 is angularly offset from adjacent mold channels around circumference 305 of rotary die 302, extruding filler material 307 into the mold channels includes rotating the rotary die 302 between each extrusion. FIGS. 4A-4C depict a partial view of rotary die 302 in a respective rotational orientation during the extrusion process. In FIG. 4A, a first mold channel 304A is filled with filler material 307 to thereby form a first radius filler segment 402A. In FIG. 4B, rotary die 302 is rotated, and a second mold channel 304B is filled with filler material 307 to thereby form a second radius filler segment 402B. In FIG. 4C, rotary die 302 has been rotated through eight extrusions, with eight radius filler segments formed in the mold channels. As described below, the radius filler segments 402 may be removed from the mold channels (e.g. after a cooling period in some examples), arranged in end-to-end contact of space 210 defined by the radius of composite wing stringer 110, and fused together to form the unitary radius filler 212 filling the space 210 of composite wing stringer 110. Further, in some examples, an interface material, such as tape comprising polytetrafluoroethylene (e.g. TEFLON tape, available from The Chemours Company of Wilmington, Del.), may be arranged in each mold channel 304, with filler material 307 deposited in each mold channel 304 over the interface material. The interface material may aid in unseating radius filler segments 402 formed by the filler material 307 from mold channels 304. Alternatively, or additionally, rotary die 302 may be coated in a release agent (e.g. FREKOTE, available from Henkel AG & Company of Dusseldorf, Germany) to facilitate removal of radius filler segments 402. Further, rotary die 302 may comprise a tooling foam, and/or any other suitable material(s).

In the example of FIGS. 3-4C, where each mold channel has a length of ten feet, eight ten-foot radius filler segments may be formed, and later joined together to form an eighty-foot radius filler—e.g. for an eighty-foot long space of a composite wing stringer. In other examples, rotary die 302 may be configured with any other suitable length and/or number of mold channels. As additional examples, rotary die 302 may be rotated between six to ten extrusions, with filler material being extruded into mold channels each having a length between eight and twelve feet. In other examples, a rotary die may have any other suitable configuration, based upon the geometry of a space to be filled using the rotary die. Further, while the examples depicted in FIGS. 4A-4C show an area immediately adjacent to each mold channel that is substantially flat, such that the rotary die 302 comprises a polygonal circumference 404 with multiple flat surfaces 406, each flat surface hosting a mold channel, in other examples the area adjacent to each mold channel may have a curved geometry in a circumferential direction, or may exhibit any other suitable geometry in a circumferential direction. Also, in some examples, a plurality of dies may be arranged (e.g. in parallel and/or in series) for filling by a same extrusion orifice, wherein each die of the plurality of dies comprises a plurality of mold channels, and each die is coupled to a motor to allow rotation of the die. The extrusion system then may be used to sequentially extrude the filler material into each mold channel of each die of the plurality of dies. This may help to increase throughput of a radius filler fabrication system. Further, in some examples, rotary die 302 may be removable from apparatus 300 (e.g. from a rotary mandrel in the apparatus), enabling different dies to be swapped into and out of the apparatus. This may help to increase fabrication throughput. Where dies of differing mold channel geometry are used, such dies may be swapped to manufacture filler segments potentially of differing profile with high throughput.

As shown in the example depicted in FIG. 3, apparatus 300 may employ a motor 312 to rotate rotary die 302 (e.g. via a thrust bearing) between each extrusion. Further, apparatus 300 may use an optical sensing system 313 configured to image the mold channels (e.g. via one or more lasers, cameras, or other similar imaging devices), and a feedback mechanism configured to provide a signal to motor 312 prompting rotation of rotary die 302, to control extrusion into the mold channels 304, as examples. Further, in some examples, a parallel gripper 314 may be used to hold and/or guide radius filler material 307 as it is extruded to help seat the material. In other examples, any other suitable mechanisms may be used to control extrusion into rotary die 302. For example, parallel gripper 314 may be omitted, and compaction wheel 310 may be used without the parallel gripper to seat radius filler material 307 within mold channels 304.

Figure 5:
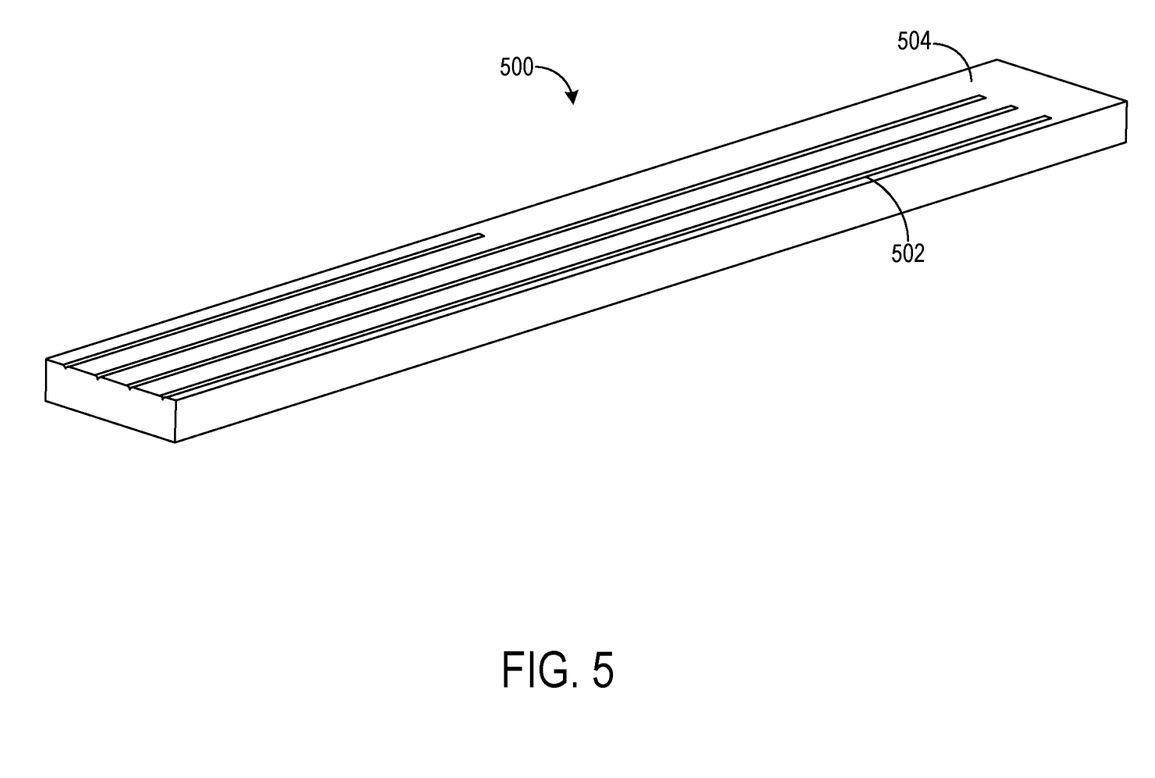
FIG. 5 shows an illustration depicting a planar die for fabricating radius filler segments for the composite wing stringer of FIGS. 2A-2B according to an example embodiment of the present disclosure.

The approaches described herein for fabricating radius filler segments are applicable to dies other than a rotary die with circumferentially arranged mold channels. As another example, FIG. 5 shows a planar die 500 that may be used to form radius filler segments for composite wing stringers. Planar die 500 includes a plurality of mold channels (e.g. mold channel 502) each laterally offset from one or more adjacent mold channels on a substantially planar surface 504 of the planar die. Here, extruding filler material into each mold channel may include changing a relative lateral position of planar die 500 and an extrusion orifice between each extrusion. In any example, each mold channel may have a same length, while in other examples one or more mold channels may have different lengths.

Figure 6A:
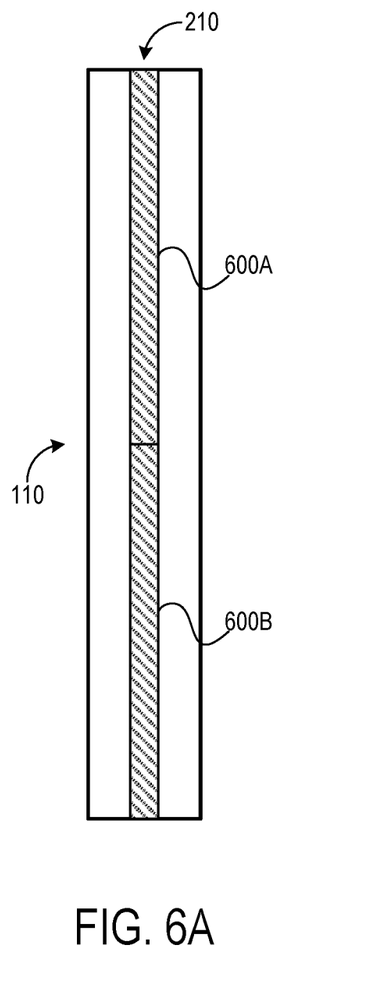
FIG. 6A shows an illustration schematically depicting two radius filler segments arranged in end-to-end contact in a space defined by a radius of the composite wing stringer of FIGS. 2A-2B before curing.
Figure 6B:
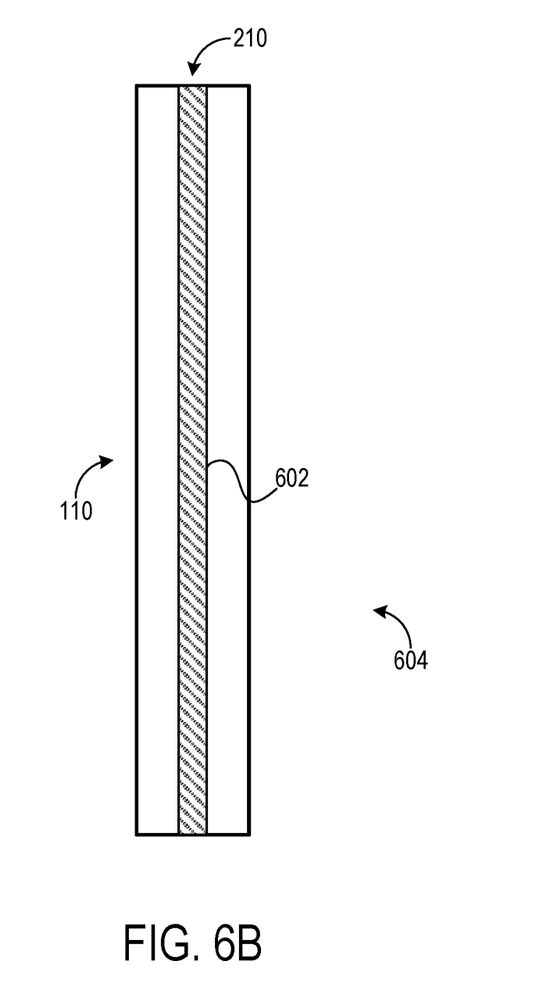
FIG. 6B shows an illustration schematically depicting a radius filler after curing the radius filler segments of FIG. 6A.

As described above, radius filler segments fabricated according to the described approaches may be arranged in space 210 (FIGS. 2A-2B) and cured to thereby fuse the filler segments to each other and to other stringer portions. FIGS. 6A and 6B respectively illustrate schematically the arrangement of a radius filler in space 210 defined by composite wing stringer 110 before and after curing of the radius filler. In FIG. 6A, two radius filler segments 600A and 600B are arranged in end-to-end contact (e.g., abutingly directly contact) in space 210. In FIG. 6B, the radius filler segments have been cured to form a unitary radius filler 602. Further, the curing process also bonds radius filler segments 602 to other portions (e.g. portions 202A and 202B of FIGS. 2A-2B) of composite wing stringer 110 to form a unitary structure 604 comprising the composite wing stringer 110 and radius filler 602. In this way, a plurality of composite wing stringers may be formed that each comprises a corresponding radius filler having a plurality of filler segments each fused with one or more adjacent filler segments in an end-to-end arrangement.

In some examples, curing radius filler segments 600A and 600B may include heating the radius filler segments 600 to form radius filler 602. For example, radius filler segments 600A and 600B may be heated to approximately 350° C. to initiate and perform a curing process, thereby chemically fusing and cross-linking a polymer resin material or other suitable material that forms composite wing stringer 210 and radius filler segments 600A and 600B. In other examples, any other suitable curing process may be used, such as a photo-initiated curing process.

Figure 7:
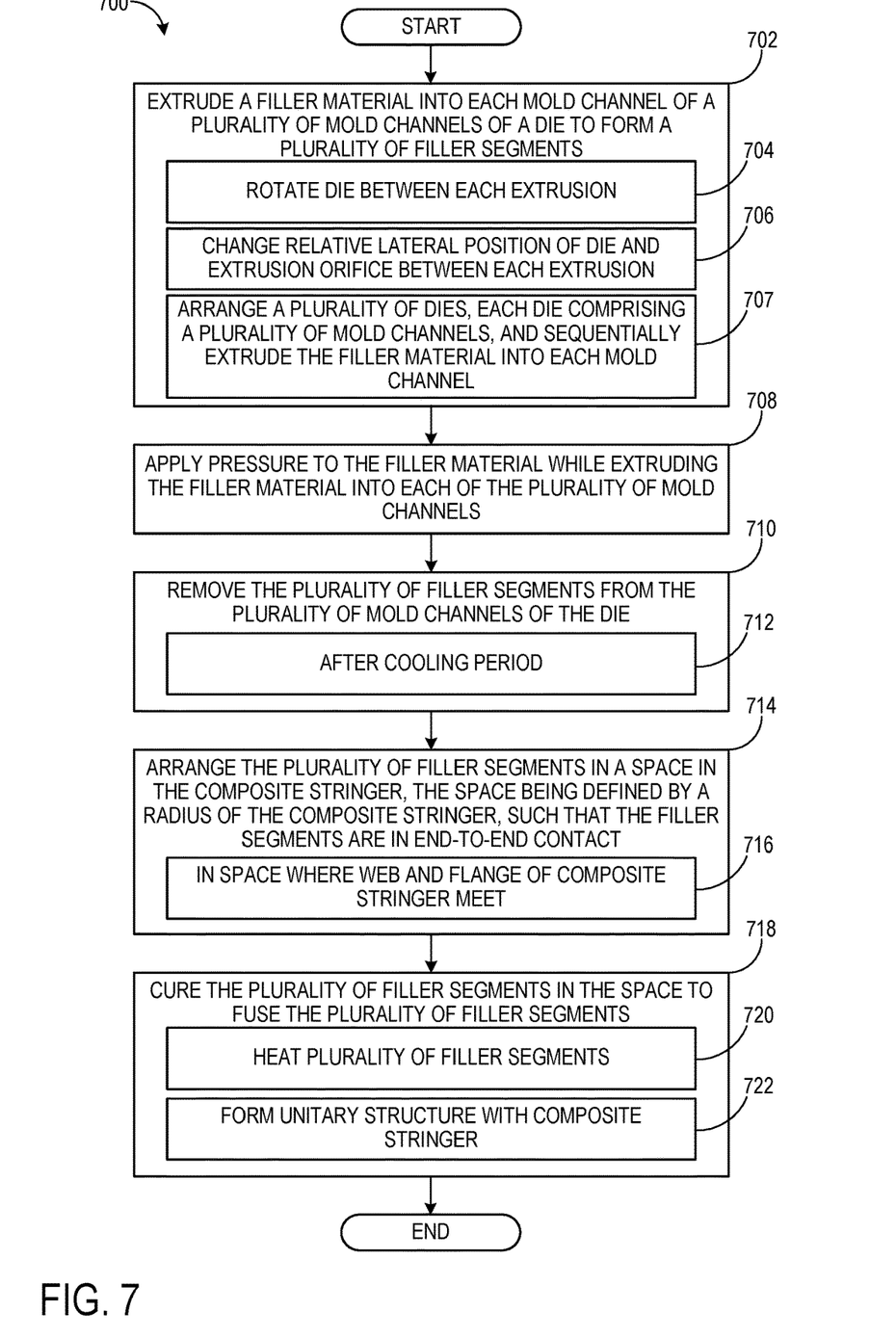
FIG. 7 shows an illustration of operations of a method performed according to an example embodiment of the present disclosure.

FIG. 7 shows a flowchart illustrating a method 700 of fabricating a composite structural component for an aircraft. Method 700 may be performed to fabricate composite wing stringer 110, as one example.

At 702, method 700 includes extruding a filler material (e.g., filter material 307) into each mold channel of a plurality of mold channels (e.g., mold channels 304) of a die (e.g., rotary die 302) to form a plurality of filler segments (e.g., filler segments 600). In some examples, extruding the filler material may include rotating 704 a rotary die between each extrusion. In other examples, extruding the filler material may include changing 706 the relative lateral position of a planar die (e.g. planar die 500) and an extrusion orifice (e.g. extrusion orifice 308) between each extrusion. Further, in some examples, method 700 may include arranging a plurality of dies, each die of the plurality of dies comprising a plurality of mold channels, and sequentially extruding the filler material into each mold channel of each die of the plurality of dies, as indicated at 707.

At 708, method 700 may include applying pressure to the filler material while extruding the filler material into each of the plurality of mold channels (e.g. by a compression wheel that follows the extrusion orifice). At 710, method 700 includes removing the plurality of filler segments from the plurality of mold channels of the die. The plurality of filler segments may be removed from the plurality of mold channels after a cooling period 712. In some examples, the plurality of mold channels may be covered with an interface material (e.g. Teflon tape) or a coating (e.g. FREKOTE) to facilitate removal of the plurality of filler segments.

At 714, method 700 includes arranging the plurality of filler segments in a space in the composite stringer, the space being defined by a radius of the composite stringer, such that the filler segments are in end-to-end contact. The plurality of filler segments may be arranged in a space 716 where a web and a flange of the composite stringer meet in some examples, or in any other suitable space in other examples.

At 718, method 700 includes curing the plurality of filler segments in the space to fuse the plurality of filler segments. Curing the plurality of filler segments may include heating 720 the plurality of filler segments. Curing the plurality of filler segments forms a unitary structure 722 with the composite structure.

The apparatuses and processes described herein have the potential benefit of reducing the complexity, labor, and consumption of physical space in fabricating a radius filler for composite wing stringers and other structures. For example, forming a plurality of filler segments, and curing the plurality of filler segments to form a radius filler, may enable the use of a smaller die to form the plurality of filler segments. As another example, the use of a rotary die may enable an apparatus to at least partially automate the extrusion of a filler material to form filler segments by rotating the rotary die between extrusions. As another example, extruding filler material into mold channels of a die having a length of between eight and twelve feet may enable a reduction of the labor expended in handling the filler segments. As another example, the use of a planar die may enable an apparatus to at least partially automate the extrusion of a filler material to form filler segments by changing a relative position of an extrusion orifice and the planar die. As another example, applying pressure to filler material while extruding the filler material into mold channels of a die may enable the formation of filler segments with a desired geometry that fills the space defined by the radius of a composite structural component. As another example, removing filler segments from mold channels after a cooling period may facilitate the desired formation of the filler segments with desired material properties. As another example, curing filler segments by heating the filler segments may facilitate the fusion of the filler segments with one another and to a composite structural component to form a unitary structure. As another example, arranging a plurality of dies, and sequentially extruding filler material into each mold channel of each die of the plurality of dies may enable an increase in the number of filler segments formed, and thus reduce a fabrication time for fabricating filled composite structural components. As another example, arranging the filler segments in a space where a web and a flange of a composite structural component meet may enable the fabrication of a relatively strong composite structural component that reinforces a first component and transmits forces acting upon the first component to a second component. As another example, filling composite structural components with a radius filler formed by fusing filler segments may enable the fabrication of stronger aircraft with greater load-bearing capacity.

The present disclosure includes all novel and non-obvious combinations and subcombinations of the various features and techniques disclosed herein. The various features and techniques disclosed herein are not necessarily required of all examples of the present disclosure. Furthermore, the various features and techniques disclosed herein may define patentable subject matter apart from the disclosed examples and may find utility in other implementations not expressly disclosed herein.

The invention claimed is:

1. A method of fabricating a composite structural component for an aircraft, the method comprising:
   extruding a filler material into each mold channel of a plurality of mold channels of a die to form a plurality of filler segments;
   removing the plurality of filler segments from the plurality of mold channels of the die;
   arranging the plurality of filler segments in a space in the composite structural component, the space being defined by a radius of the composite structural component, such that the filler segments are in end-to-end contact; and
   curing the plurality of filler segments in the space to fuse the plurality of filler segments.

2. The method of claim 1, wherein each mold channel is angularly offset from adjacent mold channels around a polygonal circumference of the die, and wherein extruding the filler material into each mold channel of the plurality of mold channels of the die comprises rotating the die between each extrusion.

3. The method of claim 2, wherein rotating the die between each extrusion comprises rotating the die between each of six to ten extrusions.

4. The method of claim 1, wherein extruding the filler material into each mold channel comprises extruding the filler material into the mold channels having a length of between eight and twelve feet.

5. The method of claim 1, wherein each mold channel is laterally offset from one or more adjacent mold channels on a substantially planar surface of the die, and wherein extruding the filler material into each mold channel comprises changing a relative lateral position of the die and an extrusion orifice between each extrusion.

6. The method of claim 1, further comprising applying pressure to the filler material while extruding the filler material into each of the plurality of mold channels.

7. The method of claim 1, further comprising removing the plurality of filler segments from the plurality of mold channels after a cooling period.

8. The method of claim 1, wherein curing the plurality of filler segments comprises heating the plurality of filler segments.

9. The method of claim 1, wherein curing the plurality of filler segments bonds the plurality of filler segments to other portions of the composite structural component to form a unitary structure.

10. The method of claim 1, further comprising arranging a plurality of dies, each die of the plurality of dies comprising a plurality of mold channels, and sequentially extruding the filler material into each mold channel of each die of the plurality of dies.

11. The method of claim 1, wherein arranging the plurality of filler segments in the space comprises arranging the plurality of filler segments in a space where a web and a flange of the composite structural component meet.

12. The method of claim 11, wherein arranging the plurality of filler segments in the space where the web and the flange of the composite structural component meet comprises arranging the plurality of filler segments in a space where a web and a flange of a stringer for the aircraft meet.

13. The method of claim 12, wherein arranging the plurality of filler segments in the space where the web and the flange of the stringer for the aircraft meet comprises arranging the plurality of filler segments in a space where a web and a flange of a blade stringer for the aircraft meet.

14. The method of claim 1, wherein the method of fabricating the composite structural component comprises a method of fabricating an aircraft wing.

\* \* \* \* \*